Sept. 15, 1953  A. A. JOHNSON  2,652,477
CIGAR LIGHTER

Filed Oct. 19, 1949  2 Sheets-Sheet 1

Inventor
Arthur A. Johnson
By
Johnson and Kline
Attorneys

Sept. 15, 1953  A. A. JOHNSON  2,652,477
CIGAR LIGHTER
Filed Oct. 19, 1949  2 Sheets-Sheet 2
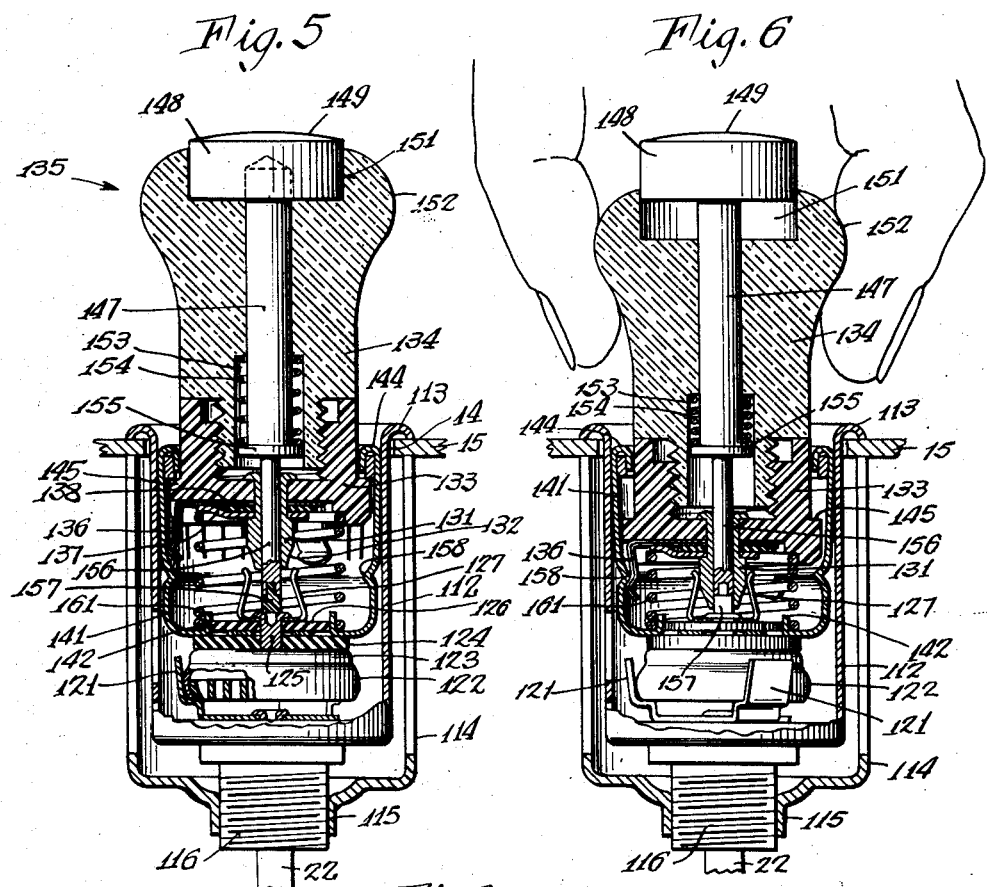
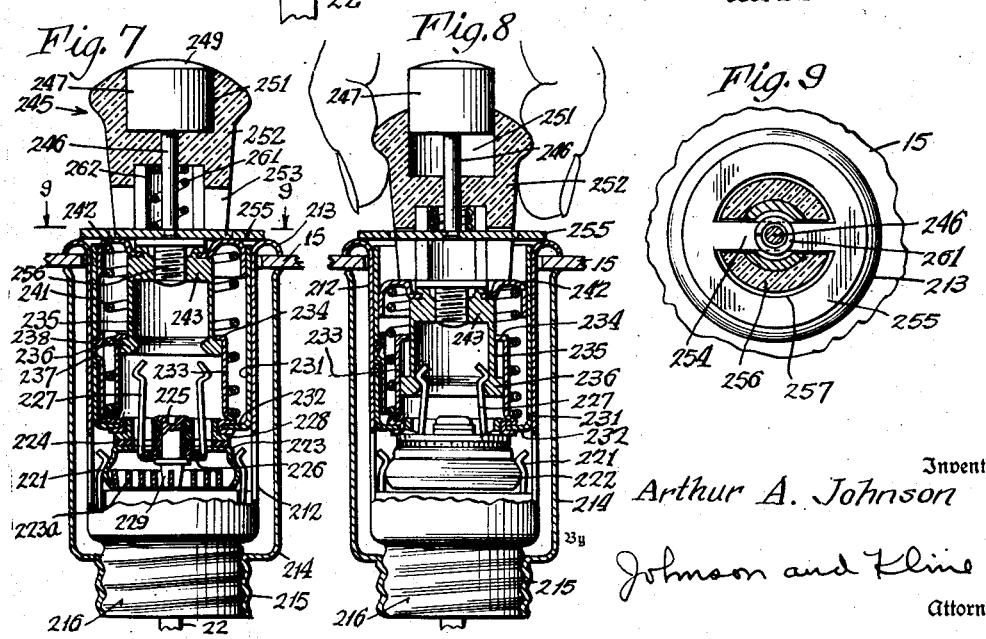
Inventor
Arthur A. Johnson
By Johnson and Kline
Attorneys Patented Sept. 15, 1953

2,652,477

UNITED STATES PATENT OFFICE 2,652,477

CIGAR LIGHTER

Arthur A. Johnson, Bridgeport, Conn., assignor to Automatic Devices Corporation, Bridgeport, Conn., a corporation of Connecticut Application October 19, 1949, Serial No. 122,198

19 Claims. (Cl. 219—32)

This invention relates to electric cigar lighters of the automatic so-called pop-out type generally used in motor cars etc., although equally adapted to non-vehicular use.

Lighters of this type usually have an igniting unit which carries a heater coil and is movably supported on a base member, usually a socket, from which it can be removed for use in lighting a cigar, cigarette or the like. It is normally stored in open-circuit, non-heating condition on the base member or socket. When wanted for use an electric current is supplied to the heater by pushing inwardly on a handle or knob attached to the igniting unit to move switch contacts into engagement. When the coil reaches the desired temperature a thermostat causes release of the parts which are then returned by spring pressure to normal stowage position, from which a user can remove the igniting unit for lighting purposes.

A great disadvantage of such devices has been the relative ease of inadvertently pushing the knob and pressing the parts into closed-circuit, heating condition when it is not intended to do so. This is done sometimes by an occupant of a motor car resting an elbow on a lighter installed in or near the arm of a back seat, or by a person getting in or out of a car, or by a folding front seat striking an igniter installed on the instrument panel. Also, returning some types of igniting units to the supporting socket or base after use frequently requires the application of such force as results in pushing the parts into closed-circuit heating condition when it is not intended.

An object of this invention is to provide an improved electric cigar lighter constructed and arranged to prevent unintentional operation of the moving parts of the lighter to bring them into closed-circuit, heating condition.

A feature of the invention is the provision in an electric cigar lighter of an abutment member arranged to block movement of the parts into operative heating position as the result of pressure applied to the end face of the associated handle or knob.

In the species herein disclosed the igniting unit has an operating and manipulating knob formed in two parts provided with juxtaposed thrust-receiving portions. One knob part is relatively stationary, while the other is movable and is formed with its thrust-receiving portion in substantially non-projecting relation to the thrust-receiving portion of the other relatively stationary part. The arrangement is such that circuit-closing movement of the parts can be accomplished by applying an actuating thrust to the movable knob part. In the illustrated embodiments this movable part is in the form of a sleeve having a thrust-receiving end forming a narrow sloping ring surrounding the stationary part and requiring a normal and convenient actuating force which is applied to it to have both gripping and thrusting components. Any general thrust casually applied to the end portion of the stationary knob part, or which overlaps the end portions of both knob parts, will be resisted by the stationary knob part from moving to close the circuit. Pressure applied to the knob as an elbow, arm, or in fact anything except the finger tips, accordingly, will have no circuit-closing effect.

As a result, the danger of the igniter being held in closed-circuit position, which might be damaging to the battery and might cause a fire, is obviated, and besides the igniter unit after use may be returned to storage position in the socket by a simple inattentive thrust on the end of the knob without causing the igniter unit to assume a circuit-closing position.

Further, if after operating the knob to close the circuit, the user for some reason wishes to open the circuit, this can be done in the forms of the invention illustrated herein by taking the movable part of the knob between the fingers and using the thumb as a purchase against the stationary part by a squeezing action of the fingers and thumb to restore the movable part to open-circuit position without removing the igniting unit from the socket.

Other features and advantages will hereinafter appear.

In the drawings:

Figs. 5 and 6 are sectional views illustrating another embodiment of the invention as used in connection with a lighter of different construction from that shown in Figs. 1 and 2.

Figs. 7 and 8 are sectional views showing still another embodiment of the invention as used in connection with a lighter of another different construction.

Fig. 9 is a transverse section on the line 9—9 of the device shown in Fig. 7.

Figure 1:
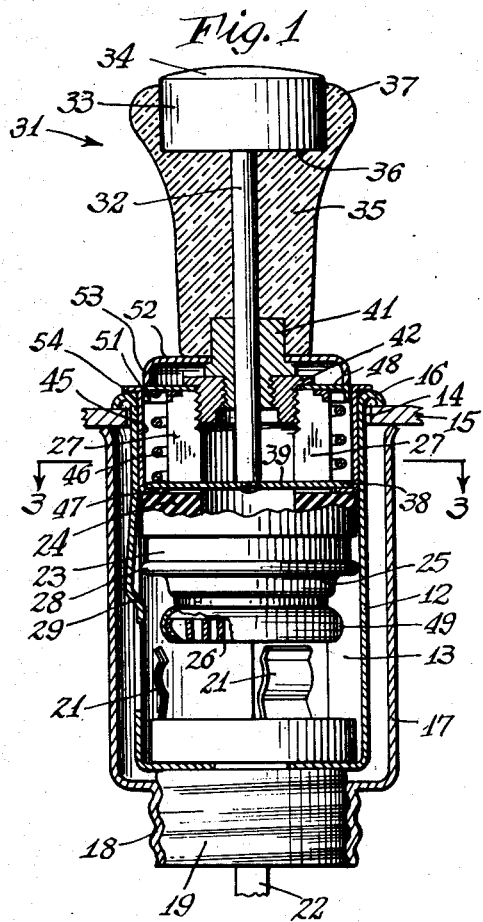
Figure 1 is a view partly in section of one embodiment of the present invention, showing the parts in normal open-circuit condition.

For disclosure purposes the invention is illustrated in connection with plug-type automatic cigar lighters such as are especially adapted for use in motor cars, although it will be apparent that the invention is equally well adapted to cigar lighters for use in other locations. The present disclosure shows and describes the invention applied to three commercial forms of automobile cigar lighters which are now on the market.

As illustrated in Figs. 1 to 4, the invention is shown applied to one well known form of commercial cigar lighter and comprises a cylindrical base or socket member comprising a shell 12 forming a deep socket 13 adapted to be mounted in a hole 14 in any suitable part such as the instrument panel 15 of a motor car. The outer end of the shell 12 or socket member has a flange 16 engaging the panel.

The socket may be secured in place by a sleeve 17 which is formed at the bottom with a threaded aperture 18 threaded on a sleeve 19 secured to the bottom of the shell 12. Ground contact by the socket member is made directly to the grounded panel 15 by engagement of the flange 16 therewith, or through the threaded connection 18, 19 and sleeve 17 to the panel which is engaged directly by the ends of the sleeve 17. Contact fingers 21 which are insulated from the socket member are supported in the lower end thereof and electrically connected to a conductor 22 leading to the car battery, or other source of current.

Figure 2:
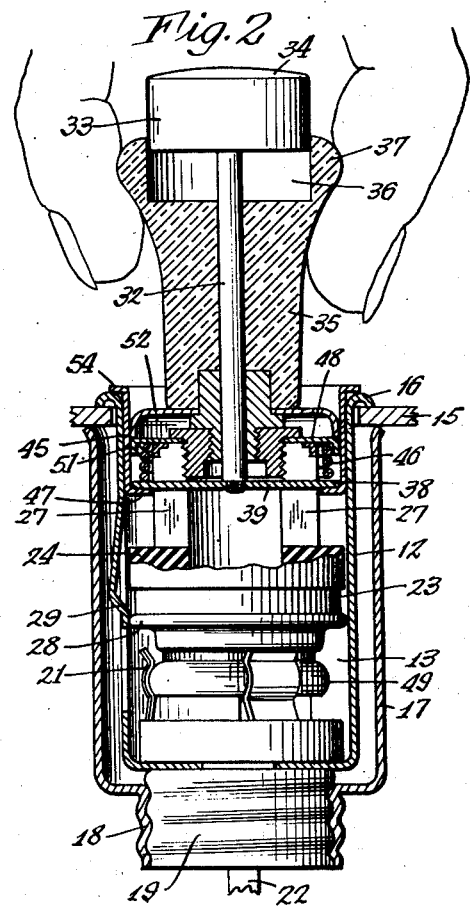
Fig. 2 is a similar view showing the parts in closed-circuit heating position.
Figure 3:
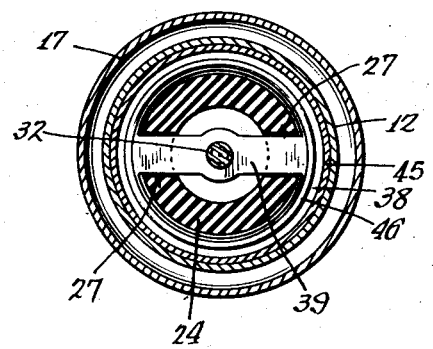
Fig. 3 is a transverse section on the line 3—3 of Fig. 1.
Figure 4:
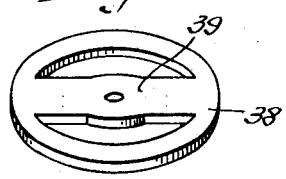
Fig. 4 is a perspective view of a detail.

In Figs. 1 and 2, a removable igniting unit 23 of the plug type comprises a relatively movable body part 24 of insulating material on the end of which is carried a housing 25 for the heater coil 26. The movable body part 24, as illustrated, has diametrically opposite slots 27 in an upper portion of reduced diameter, while the lower portion is unslotted.

The housing 25 has an annular ridge 28 for engagement with resilient contact portions 29 formed in the wall of the socket 13 to insure a good ground contact when the unit is in circuit-closing condition.

In this embodiment a handle knob 31 for manipulating and operating the igniting unit 23 projects outwardly in position to be readily grasped by a user. The knob comprises two relatively movable parts one having an inner stem 32 having a head 33 forming an end face 34, and the other a relatively slidable sleeve member 35 having a recess 36 normally receiving the head 33. The recess is so formed that the surrounding portion of the sleeve 35 forms a rim 37 on the outer edge of the knob, which rim is preferably positioned in non-projecting relation to the end face 34. As illustrated, the latter provides a slightly protuberant surface. The relative arrangement of the knob parts is such that no thrust which overlaps both parts will produce sufficient relative movement of the parts to have any circuit-closing effect. The rim 37 is shown as relatively narrow and sloping so as to require an actuating force to have an encircling gripping component as well as a thrust.

The inner end of the stem 32 is threaded to the center of an abutment plate 38 having a central diametrically extending crosspiece 39 slidably positioned in the slots 27 of the plunger section 24 so that the abutment plate 38 and the movable body part 24 are slidable relatively to each other. The inner stem 32 extends slidably through a bushing 41 which is threaded at its lower end into a plug 42 which is in turn threaded to the upper end of the plunger section 24.

As shown in Figs. 1 and 2, the igniter unit has a relatively stationary body part which supports the movable body part of the igniting unit in the socket member. A sleeve 45, having a friction fit in the socket member 12, slidably surrounds the reduced, slotted end of the plunger 24. The upper end of the friction sleeve 45 has an outwardly extending radial flange 54 overlying the outer flange 16 of the sleeve or socket member 12 for support thereon. A coil spring 46 is interposed between an inturned flange 47 on the lower end of the sleeve 45 and a radial plate 48 clamped between the plug 42 and the upper end of the movable body part 24 and forming a spring seat. By this arrangement the parts are normally pressed by the spring 46 into the open-circuit, non-heating condition illustrated in Fig. 1.

In this combination the abutment plate 38 and sleeve 45 constitute a stationary body part of the igniting unit with relation to which the relatively movable part is shifted axially when it is desired to heat the heating element.

In this embodiment, when the movable part is pushed inwardly in the socket member 12, by operation of the movable part 37 of the knob, the spring contacts 21 act as a latch to yieldingly engage and hold a rounded contact surface 49 on the heating coil housing 23, as shown in Fig. 2, whereby a heating current passes through the heater coil 26. The yielding contact members 21 being formed of bimetallic strips act as a thermostat to disengage the contact surface 49 and release the movable part of the igniting unit as soon as the heater element reaches the desired temperature thereby permitting the spring 46 to snap such part back to its normal position. This snapping operation serves to notify the user that the unit is heated and ready for use. The user then can remove the unit from the socket member for lighting purposes.

In the arrangement shown in Figs. 1 to 4, the spring seat plate 48 has a downwardly extending peripheral flange 51 for guiding the movement of the plate relatively to the sleeve 45. The lower end of the knob sleeve member 35 surrounding the bushing 41 engages the outer surface of a dish-shaped presser plate 52 having a depending peripheral flange 53 engaging the outer upper edge of the spring-retaining plate 48.

In this embodiment of the invention, it will be apparent that, with the parts in the open-circuit condition illustrated in Fig. 1, pressure applied to the knob end face 34 on the knob part connected to the relatively stationary body part or any thrust which overlaps the ends of the knob parts will produce no movement of the parts to operative closed-circuit condition. This is due to the fact that pressure on the end face 34 is transmitted through the stem 32 to the abutment plate 38 which rests upon the lower flange 47 of the sleeve 45, the upper flange 54 of said sleeve overlying the outer end of the sleeve or socket member 12. Hence such pressure is simply transmitted to the supporting panel 14 or the like without producing any movement of the parts.

Sufficient movement of the parts to produce closed-circuit condition can only be accomplished by manipulating the relatively movable sleeve 35, connected to the movable body part 24, by pushing the sleeve inwardly toward the socket as shown in Fig. 2. Inward movement of the sleeve 35 operates through the bushing 41, plug 42 and presser plate 52 to press the slotted, movable body part 24 inwardly to move the housing 25 and contact rim 49 into electrical contact with the fingers 21 to complete the electrical circuit through the heater element. As above pointed out, such movement normally requires an actuating force having both gripping and thrust components. In this operation the spring plate 48 compresses the spring 46 against the abutment plate 38, as shown in Fig. 2.

The embodiment of the invention in a second commercial form of cigar lighter is illustrated in Figs. 5 and 6. This embodiment is also shown in connection with a lighter for use in motor cars positioned in the opening 14 formed in the panel 15. As illustrated, it comprises a socket member 112 extending through the opening in the dash 15 and having a flange 113 engaging the outer face of the panel. A sleeve or yoke 114 having a threaded aperture 115 secured to a sleeve 116 connected to the bottom of the socket member 112 secures the latter in place. Contact fingers 121 are electrically connected to the conductor 22 leading to the car battery or other source of potential. The spaced contact fingers 121 are adapted to engage a contact rim 122 on the outer face of a housing 123 supporting a heater element similar to the element 26 in Fig. 1.

An insulating disk 124 is secured to the top of the housing 123 by a conducting rivet 125 which also secures a second insulating disk 126 under U-shaped contact prongs 127.

One end of the heater element is electrically connected to the conducting rim 122 of the housing 123 and the other end is electrically connected to the central rivet 125 which is insulated from the housing 123.

A movable contact plug 131 having a conical lower end surface 132 for engagement with the contact prongs 127 is riveted to the lower end of an insulating movable body part 133 which is in turn screw threaded to the lower end of a sleeve 134 forming one relatively movable part of a knob 135. The contact plug 131 secures yieldable spring contact fingers 136 in place to extend downwardly from the lower face of the movable body part 133, and a conducting strip 137 electrically connects the contact plug with the spring fingers, an insulating disk 138 being positioned between the strip and the inner edges of the contact fingers.

A cup-shaped retaining member or sleeve 141 is secured to the housing 123 by the conducting rivet 125, the bottom of the cup being gripped between the insulating washers 124, 126. Retaining lugs 142 are struck up from the bottom of the cup and form retaining and centering means for the insulating washer 126. The upper edge of the cup is formed with an inturned flange 144 slidably surrounding the movable body part 133 and adapted to engage a shoulder 145 adjacent the lower portion of the section.

The sleeve 141, housing 123 and connected parts comprise a stationary body part of the igniting unit, with relation to which the relatively movable body part is shifted axially when it is desired to heat the heating element.

The knob 135 comprises a relatively stationary face which includes a center stem 147 supporting a head 148 forming an end face 149 shown as projecting beyond the other part of the knob. The head 148 is normally received within a recess 151 in the relatively movable part or sleeve 134. The recess 151 is so formed that the surrounding portion of the sleeve 134 forms a narrow, sloping rim 152 on the outer edge of the knob 135, but the end face 149 overlies the rim portion 152 and provides a slightly protuberant face. The lower end of the sleeve 134 is formed with a recess 153 receiving a helical spring 154 compressed between the bottom of the recess and a collar 155 on the stem 147 for normally pressing the sleeve 134 outwardly so as to retain the head 148 seated within the recess 151. Below the collar 155 the stem 147 has an extension 156 of reduced diameter extending through the hollow contact plug 131 and provided at its lower end with an insulating abutment 157 which bears directly on the adjacent end of the conducting rivet 125.

In this embodiment the circuit through the heater element is closed by moving the knob sleeve part 134 which is connected to the movable part of the igniting unit so as to shift the contact plug 131 downwardly into engagement with the contact prongs 127, in which position it is retained by engagement of the bimetallic contact fingers 136 with an inner annular shoulder 158 formed around the inside of the retaining cup 141. In this embodiment also, such movement normally requires an actuating force having both thrusting and gripping components. In this closed-circuit position, the fingers act as a latch to hold the plug in contact with the prongs 127 against the pressure of a coil spring 161 interposed between the inner end of the movable body part 133 and the bottom of the retaining cup 141. Thus, an electric circuit is established through the conductor 22, contacts 121, conducting rim 122 of a heater element housing 123, then through the heater element, conducting rivet 125, prongs 127, plug 131, conducting strip 137, bimetallic retaining fingers 136, retaining cup 141, socket member 112, and grounded panel 15.

It will be apparent that movement of the parts into the closed-circuit condition illustrated in Fig. 6 can only be effected by causing movement of the movable sleeve part 134 of the knob relatively to the stem 147 against the pressure of the spring 161. Pressure applied to the end face 149 of the knob accidentally or intentionally, will be transmitted directly through the stem 147, and extension 156 to the insulating rivet 125, heater housing 123 and socket member 112 to the supporting panel 15, so that no movement of the parts to closed-circuit position will result. Such movement can only be accomplished by relative movement between the relatively stationary stem part 147 and the relatively movable sleeve part 134 of the knob, by pushing the sleeve only toward the socket member 112 against the pressure of the spring 161. This operation will usually require gripping as wel as thrusting the sleeve 134 by the user.

When the heater element has reached the desired temperature the bimetallic fingers 136 release the retaining cup 141 and the parts are returned to normal open-circuit condition by the spring 161. This operation draws the attention of the user to the fact that the element is ready for use. The entire igniting unit can then be withdrawn from the socket member 112 by the knob 135 and returned to the socket after use. In such returning action no amount of pressure on the end face 149 can shift the movable parts into closed-circuit position. Any such pressure serves merely to locate the igniting unit in the socket member 112 in the relatively movable sleeve part 134 of the knob, preferably by pushing the sleeve toward the socket member 112 against the pressure of the spring 161. This operation will usually require gripping as well as thrusting the sleeve 134 by the user.

When the heater element has reached the desired temperature the bimetallic fingers 136 release the retaining cup 141 and the parts are returned to normal open-circuit condition by the spring 161. This operation draws the attention of the user to the fact that the element is ready for use. The entire igniting unit can then be withdrawn from the socket member 112 by the knob 135 and returned to the socket after use. In such returning action no amount of pressure on the end face 149 can shift the movable parts into closed-circuit position. Any such pressure serves merely to locate the igniting unit in the socket member 112 in storage position with the parts in the open-circuit condition illustrated in Fig. 5. Likewise, no pressure applied to the end face 149 of the knob, as by accidentally leaning on it for example, and no thrust which overlaps the ends of the knob parts, will result in moving the parts into closed-circuit condition.

The invention is also shown applied to a third commercial type lighter in Figs. 7, 8 and 9 which illustrate a socket member or sleeve 212 positioned in the opening 14 of the panel member 15 and having a curved flange 213 engaging the outer face of the panel. A supporting sleeve 214 engages the opposite side of the panel and has a threaded extension 215 secured to a threaded sleeve 216 connected to the bottom of the socket member 212 for securing the latter in place.

Spring contact fingers 221 are electrically connected to the conductor 22 which supplies potential to the fingers. The fingers are adapted to engage and hold a contact rim 222 on the end of a housing 223 supporting a heater element 223a. An insulating disk 224 is secured to the top of the housing 223 by a current-conducting rivet 225 which also secures a second insulating disk 226 under the web of U-shaped contact prongs 227. The prongs extend upwardly through perforations in the insulating disk 224 and in a superimposed plate 228 covering the insulating disk 224. The rivet 225 is provided with a terminal head 229 to which the inner end of the heater element 223a is connected, the other end of the heater element being electrically connected to the conducting rim 222 of the housing 223.

A retaining sleeve 231 having a sliding frictional fit in the socket member 212 has an inner flange 232 at the lower end thereof connected to the lower end of a guide sleeve 233 which is secured to the plate 228 and extends upwardly therefrom. The upper end of the guide sleeve has an inwardly extending flange 234 slidably fitting a telescoping sleeve 235 having a lower upset end 236 adapted to engage the inner edge of the flange 234 and limit the separation of the telescoping sleeves. A detent button 237 in an opening 238 in the sleeve 231 insures the desired frictional engagement between the socket member 212 and the sleeve member 231.

In this embodiment the housing 223, contact prongs 227, retaining sleeve 231, and guide sleeve 233 constitute a relatively stationary body part of the igniting unit.

A helical spring 241 is interposed between the lower end flange of the retaining sleeve 231 and a spring-retaining end plate 242 secured to the upper end portion 243 of the telescoping sleeve 235, constituting a relatively movable body part of the igniting unit, for yieldingly pressing the parts into open-circuit position, as illustrated in Fig. 7.

A handle knob 245 has a relatively stationary part which includes a central stem 246 supporting a head 247 forming an end surface 249 projecting beyond the other parts of the knob. The head 247 is normally received within a recess 251 in a relatively movable knob member. The latter comprises a sleeve 252 having a slotted end 253 at the lower end thereof engaging the upper face of the spring-retaining plate 242 on the movable body part of the igniting unit. The lower end of the inner stationary knob stem 246 is connected to the cross member 254 of a slotted abutment plate 255 engaging both the outer face of the spring-retainer plate 242 and a central stud 256 which secures the retainer plate to the end 243 of the telescoping sleeve 235. The abutment plate 255 overlies and bears on the flange 213 of the stationary socket member 212 and is in abutting relation to the end of the sleeve 231 on the relatively stationary body part. The lower end 253 of the movable knob sleeve 252 extends through slots 257 in the abutment plate 255. A spring 261 located in a recess 262 in the sleeve member 252 and compressed between the bottom of the recess and the top face of the abutment plate 255 is provided to eliminate play between the parts of the knob.

The operation of this embodiment is generally similar to those above described. The parts are moved to closed-circuit condition by relative movement between the inner knob stem 246 and the knob sleeve 252 by shifting the knob sleeve 252 inwardly toward the socket member as shown in Fig. 8, thus shifting the movable body part of the igniting unit into closed-circuit condition. In this position the parts are retained, against the pressure of the spring 241, by engagement of the bimetallic fingers 227 which act as a latch to hold the lower rim 233 of the upper telescoping sleeve 235. In this position an electric circuit is established through the conductor 22, contacts 221, conducting rim 222 of the heater element housing 223, then through the heater element 223a, conducting rivet 225, bimetallic fingers 227, telescoping sleeves 233, 235, friction sleeve 231 and socket member 212 to the grounded panel 15. It will be apparent that movement of the parts into closed-circuit condition can only be effected by relative movement between the movable knob sleeve 252 and the relatively stationary knob stem 246, usually by pressing the outer sleeve 252 toward the socket member 212, and such movement will normally require an actuating force having both gripping and thrusting components. With the parts in closed-circuit condition, when the heater element reaches the desired temperature, the bimetallic prongs 227 will release the upper telescoping sleeve 235, allowing the spring 241 to snap the parts back to open-circuit position shown in Fig. 7, whereupon the igniting unit can be withdrawn from the socket member 212 by the knob 245 for use, and later returned to the socket for storage. In such returning movement no amount of pressure applied to the end face 249 will move the parts into closed-circuit condition.

As in the other embodiments, all pressure applied to the end face 249 of the knob, accidental or intentional, or a general thrust overlapping the ends of the knob parts, will be transmitted through the stem 246 and abutment plate 255 directly to the flange of the socket member 212 whereby such thrust is prevented from moving the parts to closed-circuit condition.

Although the relatively stationary knob part has been shown and described as projecting beyond the movable part, it will be apparent that the two end faces can be substantially flush, or the movable part can be the projecting part as long as the extent of projection is not sufficient to permit a thrust applied across both end faces to move such part far enough to close the heater circuit.

While the abutment 255 engages the flange 213 on the socket when the igniter is completely inserted in the socket, it also is in position to engage the end of the sleeve 231 of the igniter unit in the operation of returning the igniting unit to storage position on the socket and prevent the relative switch-closing movement of the igniter parts in this operation by an overlapping thrust on the end of the knob.

Thus, in each of the embodiments of the invention the movement of the knob a determinate extent necessary to close the switch contacts is prevented unless the movable part of the knob is selectively operated independently of the relatively stationary part.

Another species of my invention claimed herein is disclosed and claimed in my copending application Serial No. 122,199 filed October 19, 1949.

It will be apparent that the invention can be variously modified and adapted and portions of the improvements can be used without others.

I claim:

1. An igniting unit for an electric cigar lighter having a holding device, comprising a knob; means, including an igniting unit body, mounting the knob for movement on the holding device between projected and depressed positions, said means providing for complete removal of the knob and body from the holding device; a heating element on the igniting unit; means for closing a circuit through the heating element in response to movement of the knob to depressed position; guard means carried by the igniting unit, extending along said knob in the direction of movement thereof and having a member adjacent the most-projected portion of the knob; and means connecting the guard means to the holding device to prevent movement thereof whereby an object moving against the most-projected portion of the knob and overlapping both the knob and the guard member will engage said member and be prevented thereby from depressing the knob to energizing position.

2. An igniting unit for an electric cigar lighter having a holding device, comprising a knob; means, including an igniting unit body, mounting the knob for movement on the holding device between projected and depressed positions, said means providing for complete removal of the knob and body from the holding device; a heating element on the igniting unit; means for closing a circuit through the heating element in response to movement of the knob to depressed position; thermostatically controlled latch means for holding the knob in depressed, energizing position; means for automatically returning the knob to extended position when said latch means is released; guard means carried by the igniting unit, extending along said knob in the direction of movement thereof and having a member adjacent the most-projected portion of the knob; and means connecting the guard means to the holding device to prevent movement thereof whereby an object moving against the most-projected portion of the knob and overlapping both the knob and the guard member will engage said member and be prevented thereby from depressing the knob to energizing position.

3. The invention as defined in claim 1, in which the knob and guard means are elongate and co-axial.

4. The invention as defined in claim 1, in which the knob and guard means are elongate and co-axial, and in which the guard means is centrally located within the knob.

5. The invention as defined in claim 1, in which the guard means comprises a centrally-located button, and in which the knob has a ring-like end encircling the button.

6. An electric cigar lighter igniting unit comprising two cooperable, relatively movable electrical contacts; a heating element connected to one of said contacts; a knob having two relatively axially movable parts having juxtaposed normally substantially flush end portions, said parts being respectively connected to said contacts and one part being depressible axially with respect to the other to cause engagement of the contacts, and at its end being in substantially non-projecting relation to the end of the other part when the contacts are in their separated positions; and means rigidly connected to said other knob part, for mounting the igniting unit on a holder whereby said other part is held unyieldingly by said holder and constitutes a guard to prevent an object which is moved against the end of the knob from depressing the said one knob part.

7. An electric cigar lighter igniting unit comprising two cooperable, relatively movable electrical contacts; a heating element connected to one of said contacts; a knob having two relatively axially movable parts having juxtaposed normally substantially flush end portions, said parts being respectively connected to said contacts and one part being depressible axially with respect to the other to cause engagement of the contacts, and at its end being in substantially non-projecting relation to the end of the other part when the contacts are in their separated positions; bearing means for mounting the igniting unit on a holding device; and thrust-resistant means carried by said bearing means and rigidly connected with said other knob part and abutting the holding device whereby the other knob part is unyieldingly backed by the holding device and constitutes a guard to prevent an object which is moved against the end of the knob from depressing the said one knob part.

8. In an electric cigar lighter having a holding device, an igniting unit removably mounted on the holding device and movable thereon between projected open-circuit position and depressed closed-circuit position; a heating element on the igniting unit; means for closing a circuit through the heating element in response to movement of the igniting unit to energizing position; a projecting knob on the igniting unit for manipulating the same; guard means carried by the igniting unit, extending along said knob and having a member disposed at the most-projected portion of the knob; and means connecting the guard means to the holding device to prevent movement thereof whereby an object moving against the most-projected portion of the knob and overlapping both the knob and the guard member will engage said member and be prevented thereby from depressing the knob and shifting the igniting unit to energizing position.

9. The invention as defined in claim 8, in which the knob and guard-providing means are elongate and co-axial, the knob encircling the said means.

10. In an electric cigar lighter having a holding device, an igniting unit removably mounted on the holding device and movable thereon between projected open-circuit position and depressed closed-circuit position; a heating element on the igniting unit; means for closing a circuit through the heating element in response to movement of the igniting unit to depressed, energizing position; thermostatically controlled latch means for holding the igniting unit in energizing position; means for returning the igniting unit to open-circuit position when said latch means is released; a projecting knob on the igniting unit for manipulating the same; guard means carried by the igniting unit, extending along said knob in the direction of movement thereof and having a member disposed at the most-projected portion of the knob; and means connecting the guard means to the holding device to prevent movement thereof whereby an object moving against the most-projected portion of the knob and overlapping both the knob and the guard member will engage said member and be prevented thereby from depressing the knob and shifting the igniting unit to energizing position.

11. In an electric cigar lighter having a base, an igniting unit including a heating element supported on said base and removable therefrom for use; switch means for said heating element including cooperating contacts at least one of which is movable; a knob carried by said unit, having at its end two juxtaposed substantially flush relatively axially movable parts one of which is connected to said movable contact and moves the same into closed-circuit position when said part is shifted toward said base member, said other part projecting forwardly of the one part after the latter is so shifted; and means having abutting engagement with said base and including a member connected to said other part, for holding the said part against shifting toward the base in response to axial thrust applied to it whereby accidental engagement of said contacts by a member striking the end of the knob, is prevented.

12. The invention as defined in claim 11, in which the one knob part comprises a sleeve, and in which the other knob part comprises a stem extending through said sleeve, said stem and sleeve at the outer end of the knob being substantially flush with each other.

13. The invention as defined in claim 12, in which the outer end of the sleeve is counterbored and in which the outer end of the stem has a button receivable in the counterbore of the sleeve.

14. The invention as defined in claim 11, in which the means having abutting engagement with said base member comprises a plate having slots, and in which the one knob part has inward extensions passing through said slots, enabling relative movement to occur between said one knob part and plate.

15. An igniting unit for an electric cigar lighter having a holding device, comprising an igniting unit mounted on the holding device and removable therefrom; a heating element on the igniting unit; a projecting knob on the igniting unit for manipulating the same; means for closing a circuit through the heating element in response to movement of the knob to a depressed position; guard means carried by the igniting unit, extending along said knob to the most-projected portion thereof; and means connecting the guard means to the holding device to prevent movement thereof whereby an object moving against the most-projected portion of the knob and overlapping both the knob and the guard member will engage said member and be prevented thereby from depressing the knob to energizing position.

16. An electric cigar lighter igniting unit comprising two cooperable, relatively movable electrical contacts; a heating element connected to one of said contacts; a knob having two parts having juxtaposed substantially flush end portions, said parts being respectively connected to said contacts and one part being depressible with respect to the other to cause engagement of the contacts, and being in substantially non-projecting relation to the other part when the contacts are separated, one of said contacts comprising a thermostatically-controlled latch for maintaining said contacts engaged until the heating element is ready for use; a spring associated with said knob parts for returning said movable contact to open-circuit position when the latch becomes inoperative; and means rigidly connected to said other knob part, for mounting the igniting unit on a holder whereby said other part is held unyieldingly by said holder and constitutes a guard to prevent an object which is moved against the end of the knob from depressing the said one knob part.

17. An electric cigar lighter igniting unit comprising two cooperable, relatively movable electrical contacts; a heating element connected to one of said contacts; a knob having two parts having juxtaposed substantially flush end portions, said parts being respectively connected to said contacts and one part being depressible with respect to the other to cause engagement of the contacts, and being in substantially non-projecting relation to the other part when the contacts are separated; means rigidly connected to said other knob part, for mounting the igniting unit on a holder whereby said other part is held unyieldingly by said holder and constitutes a guard to prevent an object which is moved against the end of the knob from depressing the said one knob part, one of said electrical contacts being a thermostatically controlled latch for maintaining said contacts engaged until the heating element is ready for use; and a spring associated with said knob parts for returning said movable contact to open-circuit position when said latch becomes inoperative.

18. The invention as defined in claim 1 in which the means connecting the guard means to the holding device includes a sleeve slidably fitting the holding device and having a flange abutting the holding device.

19. The invention as defined in claim 1 in which the means connecting the guard means to the holding device includes a sleeve slidably fitting the holding devices and having a flange abutting the holding device and also having a second flange in engagement with the guard means.

ARTHUR A. JOHNSON.

References Cited in the file of this patent

UNITED STATES PATENTS

| Number | Name | Date |
|---|---|---|
| 1,732,784 | Wolfson et al. | Oct. 22, 1929 |
| 1,756,013 | Jackson | Apr. 29, 1930 |
| 1,940,463 | Rintels | Dec. 19, 1933 |
| 2,129,914 | Davis | Sept. 13, 1938 |
| 2,196,151 | Johnson | Apr. 2, 1940 |
| 2,207,601 | Shakespeare et al. | July 9, 1940 |
| 2,220,978 | Shakespeare et al. | Nov. 12, 1940 |
| 2,223,654 | Ashton | Dec. 3, 1940 |
| 2,224,034 | Lehmann | Dec. 3, 1940 |
| 2,235,750 | Pistey | Mar. 18, 1941 |
| 2,247,093 | Lehmann | June 24, 1941 |
| 2,267,592 | Kline | Dec. 23, 1941 |
| 2,276,215 | Lehmann | Mar. 10, 1942 |
| 2,288,005 | Lehmann | June 30, 1942 |
| 2,302,775 | Johnson | Nov. 24, 1942 |
| 2,319,687 | Johnson | May 18, 1943 |